US010823310B1

(12) United States Patent
McCoy

(10) Patent No.: US 10,823,310 B1
(45) Date of Patent: *Nov. 3, 2020

(54) METHOD AND APPARATUS FOR SECURING A DUCT BANK VIA HOLD-DOWN BARS

(71) Applicant: Underground Devices, Inc., Northbrook, IL (US)

(72) Inventor: Donald P McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,583

(22) Filed: Dec. 30, 2019

Related U.S. Application Data

(63) Continuation of application No. 16/591,172, filed on Oct. 2, 2019, now Pat. No. 10,591,087.

(51) Int. Cl.
  *F16L 3/22* (2006.01)
  *F16L 1/10* (2006.01)
  *F16L 3/223* (2006.01)

(52) U.S. Cl.
  CPC .............. *F16L 1/10* (2013.01); *F16L 3/2235* (2013.01)

(58) Field of Classification Search
  CPC ......... E05F 15/616; F16L 1/10; F16L 3/2235; F16B 39/026; F16B 37/065
  See application file for complete search history.

(56) References Cited

U.S. PATENT DOCUMENTS

| 2,275,058 | A | * | 3/1942 | Draving | ................. | F16B 21/20 |
| | | | | | | 411/521 |
| 2,321,157 | A | * | 6/1943 | Rees | ...................... | F16B 21/20 |
| | | | | | | 411/521 |
| 3,464,661 | A | | 9/1969 | Alesi, Jr. | | |
| 4,183,484 | A | | 1/1980 | Mathews | | |
| 4,601,447 | A | | 7/1986 | McFarland | | |
| 5,605,419 | A | | 2/1997 | Reinert, Sr. | | |
| 5,833,422 | A | | 11/1998 | Haga et al. | | |

(Continued)

OTHER PUBLICATIONS

Undated brochure, Sta-Down non-metallic conduit retaining device, Professional Plastics, 1 page.

(Continued)

*Primary Examiner* — Carib A Oquendo
(74) *Attorney, Agent, or Firm* — David W. Okey LLC

(57) ABSTRACT

A duct bank is assembled and placed into a trench. A method for securing the duct bank uses hold-down bars extending horizontally atop the duct bank and securing rods embedded in the trench. A one-way retainer, such as a push nut, is placed into a counterbore of a hand installation tool. The hand installation tool is then used to place the push nut a fixed distance onto one end of a securing rod. After removing the hand tool from the rod, the rod is then placed through an orifice of the push down bar and is extended through the duct bank. The rod is then embedded into the trench until the hold-down bar deforms slightly. This procedure is then followed for each orifice of the hold-down bar and for each hold-down bar used to secure the duct bank. The trench may then be backfilled with concrete or flowable fill.

14 Claims, 8 Drawing Sheets

(56) References Cited

U.S. PATENT DOCUMENTS

| | | | |
|---|---|---|---|
| 5,949,049 A * | 9/1999 | McCarrick | G06K 19/07 |
| | | | 235/375 |
| 7,223,052 B1 | 5/2007 | Evans | |
| 7,614,828 B1 | 11/2009 | Evans | |
| 2003/0198520 A1 | 10/2003 | Evans | |
| 2005/0135896 A1* | 6/2005 | Teal | F16B 37/065 |
| | | | 411/183 |
| 2014/0332641 A1 | 11/2014 | Wilson et al. | |

OTHER PUBLICATIONS

Undated Arcon catalogue, Arcon Ring and Specialty Corp., Carol Stream, IL, 45 pages.

Using retaining rings properly, Jonathan Slass, Machine Design, Nov. 4, 1999, 4 pages.

* cited by examiner

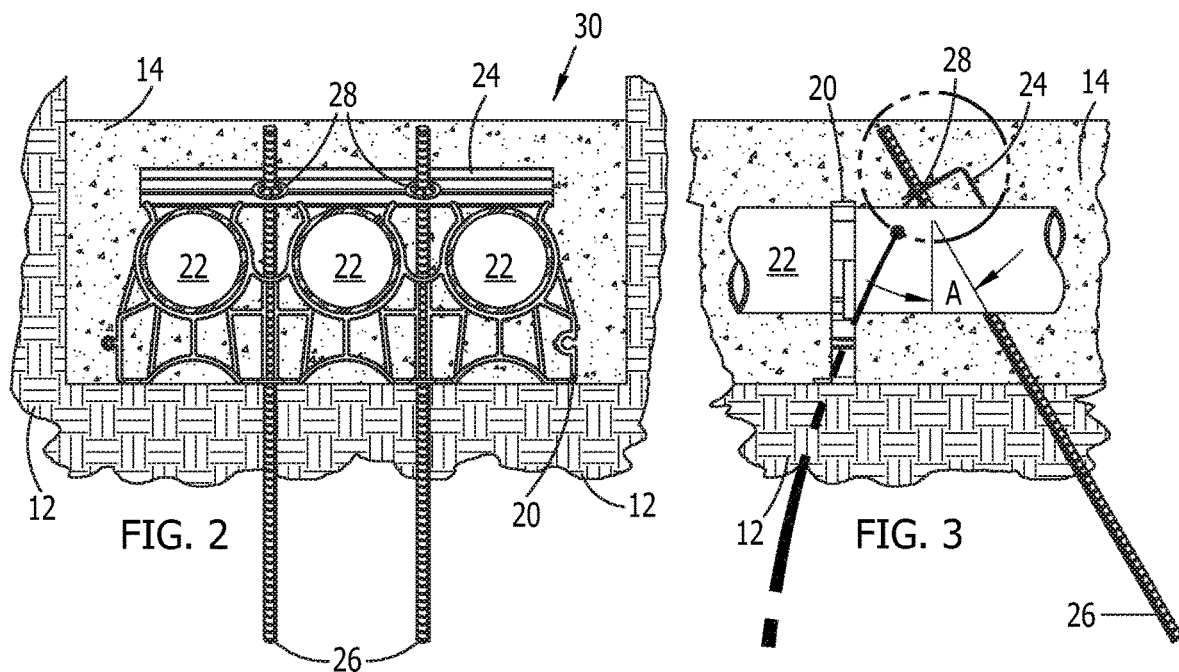
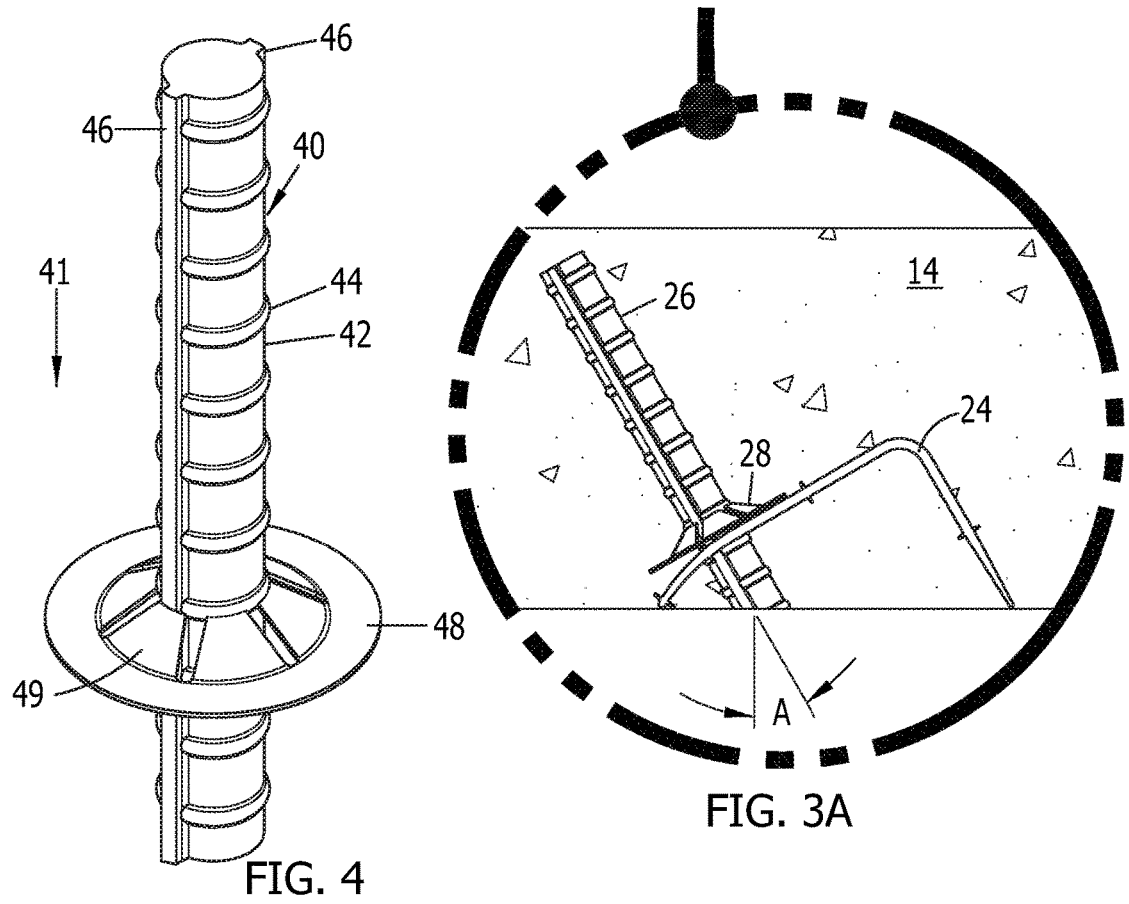

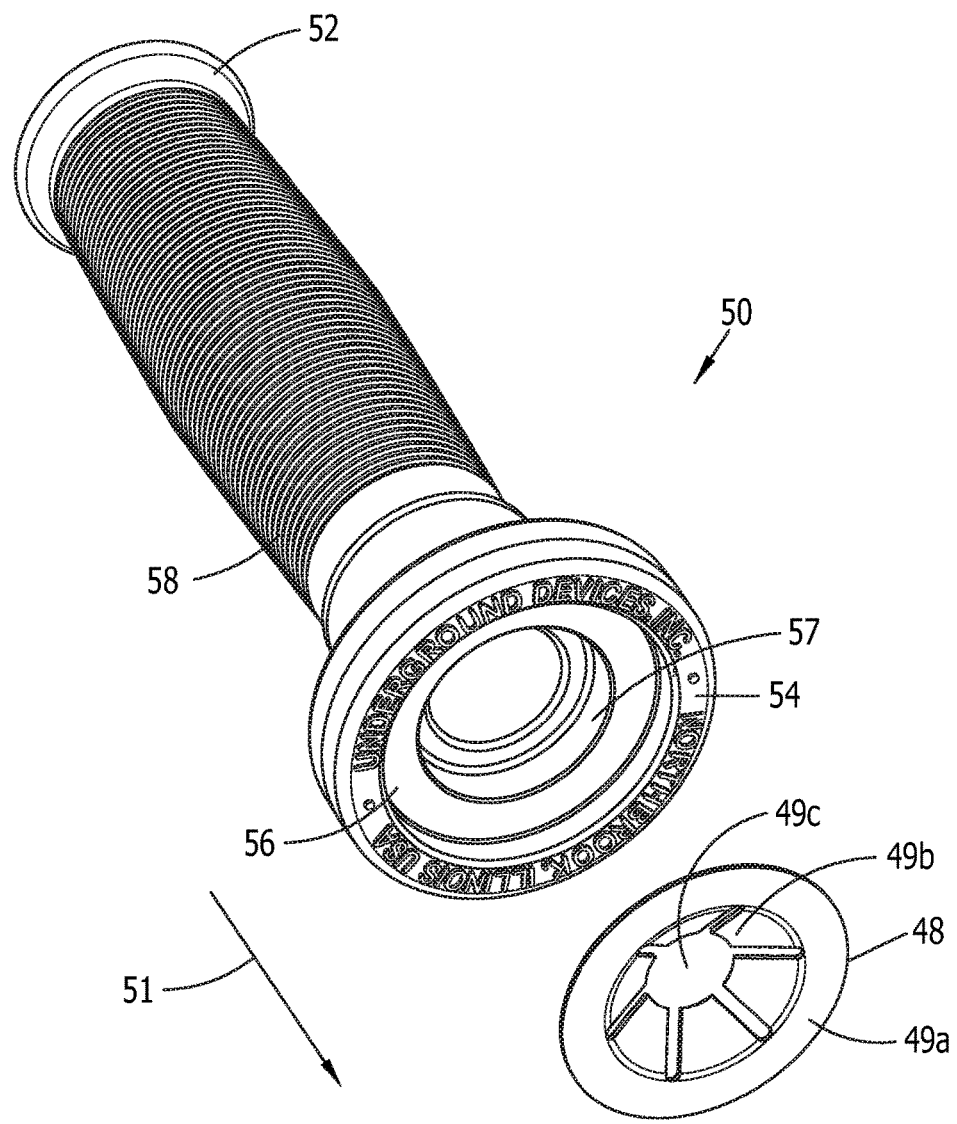
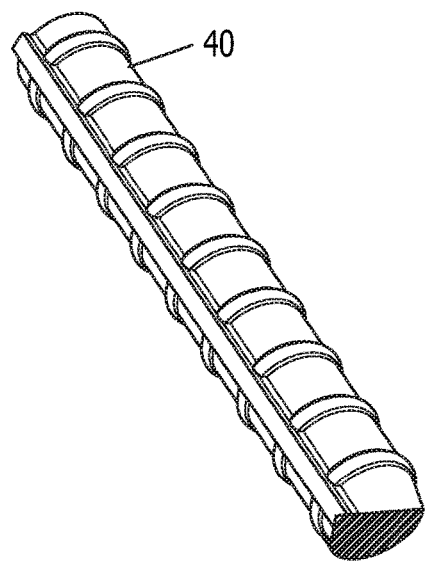
FIG. 5

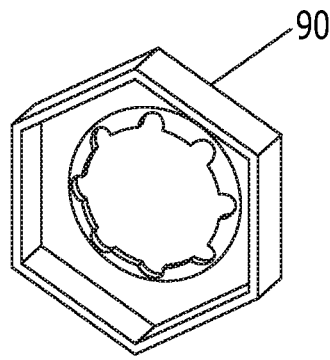
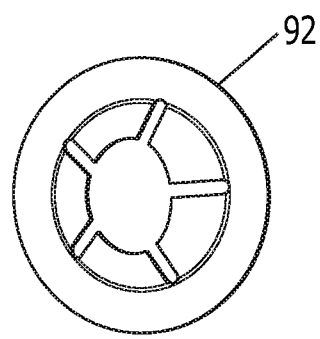
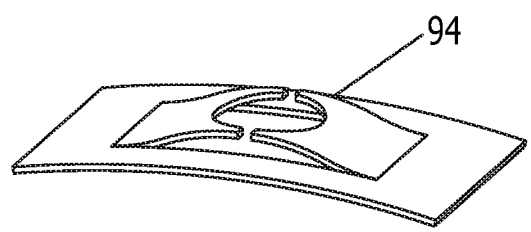
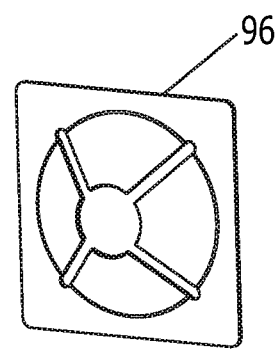
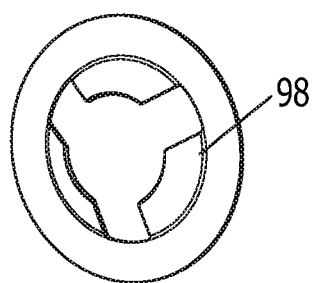
FIG. 9

METHOD AND APPARATUS FOR SECURING A DUCT BANK VIA HOLD-DOWN BARS

CLAIM TO PRIORITY

This application is a continuation application claiming priority to U.S. patent application Ser. No. 16/591,172, filed Oct. 2, 2019, which is hereby incorporated by reference in its entirety.

TECHNICAL FIELD

The technical field is that of duct banks and spacers for separating and supporting power and communication conduits in underground trenches. In particular, the disclosure deals with methods and apparatus for securely holding a duct bank in place in the trench before and during backfilling, such as filling the trench with concrete or flowable fill.

BACKGROUND

Cables for electric power, control and communication lines are run underground in order to protect them from above-ground elements and from the interference and damage they would suffer when installed above the ground or on poles or other structures. Conduits, also called ducts, run underground for such cables should be parallel to each other and spaced apart from each other in a controlled manner in order to minimize any electrical interference. This spacing also acts to dissipate the heat generated by transmission of electric power and electric signals in the cables. In addition, the conduits and cables should be protected, primarily from digging, whether with hand tools or with mechanized equipment, such as backhoes.

A trench may be dug and conduits placed into the trench at a distance from each other. For example, a series of conduits may be placed side-by-side in the bottom of the trench and separated from each other by removable spacers. Once the conduits are placed, the spacers may be removed and all space between the conduits filled with earth, sand or concrete. Thus, the space is filled with thermally conducting but electrically insulating material.

It is important to fill all the spaces between the conduits no matter which technique is used to space them apart. It is difficult to accomplish this when the conduits are in several vertical layers or tiers. The filler material ideally should be a flowable material, i.e., a material that flows freely downward and sideways in all directions when dispensed into the trench. A more-flowable filler material consists of 50 to 100 lb (about 23 to about 45 kg) Portland cement, 2750 lb (about 1250 kg) of fine sand, and 500 lbs. (about 227 kg) water (maximum) per cubic yard (about 0.765 cubic meters), having a 28-day compressive strength of 50-150 psi (about 0.34 MPa-about 1 MPa). A heavier but still flowable filler material includes a normal weight concrete mix with Portland cement, aggregate having a maximum size of ⅜ inch (about 9-10 mm), and sand and water. The heavier material has an 8 inch (about 203 mm) minimum slump and a 28-day compressive strength of 3000 psi (about 21 MPa). The ability to spread and fill the entire space is needed for good heat transfer and thermal conductivity.

One way to insure even spacing between conduits for power and communications cables is to fabricate banks of ducts which are separated by conduit spacers, also known as duct spacers. The duct banks are then encased in concrete or flowable fill. After the concrete has hydrated or set, cables are pulled through the conduits. The concrete provides a heat transfer medium for conducting heat to the surface, normally the ground surface, and also protects the cables from moisture, rodents and any contractors attempting to dig in the immediate vicinity of the duct bank.

Fabrication of a duct bank typically requires preparing an assembly of conduits and spacers in a trench and then encasing the duct bank in concrete or flowable fill. One method of assembling the spacers is to simply place conduits into bores prepared in a first layer of one or more spacers, and then to place additional spacers and conduit atop the bottom layer. A sturdier assembly may be made by positively locking the conduits into the spacers and by locking the spacers themselves together. Spacers, such as those made by Underground Devices, Inc., Northbrook, Ill., typically include attachment features that allow interlocking of the spacers in a horizontal direction. The spacers are then assembled with the conduits. The conduits themselves provide vertical interlocking with the spacers. This combination of horizontal and vertical interlocking thus joins the spacers and conduits into a duct bank, an assembly that is placed into a trench, and as noted above, is then backfilled to provide mechanical stability and heat transfer.

One problem that is encountered with such duct banks is the phenomenon of the duct bank floating or moving when backfilling the trench with concrete or flowable fill. The duct bank includes conduits or ducts and spacers that have a specific gravity that is far less than concrete or flowable fill. Therefore, when concrete is poured into the trench, the duct bank may move and will float unless it is restrained.

In order to restrain the duct bank and hold it in place, an apparatus such as a conduit retainer may be used, as described in U.S. Pat. No. 7,223,052, in U.S. Pat. No. 7,614,828, and in U.S. Pat. Appl. Publ. 2003/0198520. These patent documents describe techniques that use hold-down bars atop the duct bank to secure the duct bank within a trench. The hold-down bars are secured with anchors on the sides of the trench. Other variants of these techniques are also known, as disclosed in the accompanying Information Disclosure Statement. The disadvantage of this technique is the effort required to secure the hold-down bars at sufficient spacing on both sides of the trench. This technique also fails to secure the duct bank from horizontal movement during backfilling, i.e., the duct bank may move unpredictably in a sideways direction within the trench even though it is restrained against vertical movement.

Another technique uses hold-down bars atop the duct bank, the hold-down bars secured with rods driven through the duct bank and into the trench. The hold-down bars are then secured to the securing rods with retaining rings, e.g., retaining rings, such as type-E retaining rings. These retaining rings are secured on top of the hold-down bars to the securing rods around only a portion of their periphery or circumference. The retaining function is often tenuous and may not be reliable. Thus, the hold-down bars themselves may not be securely held.

What is needed is a method and apparatus to reliably secure the duct bank in place in the trench while backfilling takes place. The method and apparatus should be able to withstand the considerable forces applied to the duct bank during backfilling, these forces capable of moving the duct bank itself sideways during backfilling, and also capable of causing the duct bank to float during backfill if the hold-down bars are not reliably secured to the securing rods.

BRIEF SUMMARY

A first embodiment is a method for securing a duct bank in a trench. The method includes steps of a) placing a hold-down bar across a top of the duct bank in the trench, b) placing a push nut into a counterbore of a push nut installation tool, c) placing the push nut onto a near end of a securing rod using the push nut installation tool until the near end of the securing rod bottoms out in the push nut installation tool, and d) removing the push nut installation tool from the securing rod. The method also includes steps of e) placing a far end of the securing rod through an orifice of the hold-down bar until the far end of the securing rod rests on a bottom of the trench and f) securely embedding the far end of the securing rod into the trench until the push nut slightly deforms the hold-down bar. The method then includes steps of g) repeating the steps of b) through f) for each orifice of the hold-down bar with a separate securing rod for each orifice, and h) optionally, placing one or more additional hold-down bars across the top of the duct bank and repeating steps b) through f) for each orifice of the one or more additional hold-down bars, using a separate securing rod for each orifice of the one or more additional hold-down bars.

A second embodiment is another method for securing a duct bank in a trench. The method includes step of a) placing a hold-down bar across a top of the duct bank in the trench, b) placing a one-way retainer a specified distance from a near end of a securing rod, c) placing a far end of the securing rod through an orifice of the hold-down bar until the far end of the securing rod rests on a bottom of the trench, and d) securely embedding the far end of the securing rod into the trench until the push nut slightly deforms the hold-down bar. The method then includes e) repeating the steps of b) through d) for each orifice of the hold-down bar using a separate securing rod for each orifice of the hold-down bar; and f) optionally, placing one or more additional hold-down bars across the top of the duct bank and repeating steps b) through d) for each orifice of the one or more additional hold-down bars, using a separate securing rod for each orifice of the one or more additional hold-down bars.

Another embodiment is yet another method for securing a duct bank in a trench. This method includes steps of a) placing a hold-down bar across a top of the duct bank in the trench, b) placing a one-way retainer into a counterbore of a one-way retainer installation tool, c) placing the one-way retainer onto a near end of a securing rod using the one-way retainer installation tool until the near end of the securing rod bottoms out in the one-way retainer installation tool. The method then includes d) removing the one-way installation tool from the securing rod, e) placing a far end of the securing rod through an orifice of the hold-down bar until the far end of the securing rod rests on a bottom of the trench, and f) securely embedding the far end of the securing rod into the trench until the one-way retainer slightly deforms the hold-down bar. The method then calls for g) repeating the steps of b) through f) for each orifice of the hold-down bar with a separate securing rod for each orifice, and h), optionally, placing one or more additional hold-down bars across the top of the duct bank and repeating steps b) through f) for each orifice of the one or more additional hold-down bars, using a separate securing rod for each orifice of the one or more additional hold-down bars.

Yet another embodiment disclosed herein is a tool for placing a one-way retainer onto a securing rod for embedding in a trench. The tool includes a handle on a proximal end of the tool, a counterbore for mounting the one-way retainer on a distal end of the tool, and a gauge for placing the one-way retainer a specified distance onto the securing rod, wherein the duct bank is secured in the trench by a first end of the securing rod embedded in the trench and the one-way retainer secures a hold-down bar atop the duct bank near a second end of the securing rod.

Still another embodiment disclosed herein is a tool for placing a one-way retainer onto a rod, such as a securing rod. The tool includes a handle on a proximal end of the tool, a counterbore for mounting the one-way retainer on a distal end of the tool, and a gauge for placing the one-way retainer a specified distance onto the rod.

Another embodiment is a push nut for use with a reinforcing bar. The push nut includes an outer rim, an inner orifice, wherein the inner orifice is greater than a minor diameter of the reinforcing bar and less than a major diameter of the reinforcing bar that includes at least one rib, and a plurality of fingers connecting the outer rim to the inner orifice, wherein a length of the plurality of fingers is at least 9 times a minimum height of a rib of the reinforcing bar. The push ring may be largely two-dimensional, having length and width intended to be perpendicular to the reinforcing bar with which its use is intended. The push nut may have a depth or height generally much less than its length and width, but greater than the thickness of the material from which the push nut is made, the depth typically at least three or four times the thickness of the material itself. The outer rim of the push nut may be flanged, i.e., itself having depth, and the outer rim may include installation tabs or other mechanical assistants.

Other embodiments and advantages of the invention will become more apparent from the following detailed description when taken in conjunction with the accompanying drawings.

BRIEF DESCRIPTION OF THE DRAWINGS

FIG. 2 is a cross-sectional view of a duct bank using the embodiment of FIG. 1.

FIG. 3 is a side view of FIG. 2.

FIG. 3A is close-up of FIG. 3 depicting details of the interface been the top of the duct bank, the hold-down bar, the one-way retainer and the securing rod.

FIG. 4 is a close-up view of a securing rod using a one-way retainer.

FIG. 5 is an exploded view of an installation tool, and how the tool is used to place a one-way retainer onto a securing rod.

FIG. 9 depicts alternate one-way retainers that may be used in the present disclosure.

DETAILED DESCRIPTION OF THE DISCLOSURE

The present disclosure includes methods for placement of securing rods through the duct bank and into the earth beneath a trench into which the duct bank is placed. In this method, the securing rods are also placed through orifices in one or more hold-down bars used to clamp the top of the duct bank and secure it within the trench. The disclosure includes precision placement of one-way securing means onto the securing rods in a manner that tightly secures the hold-down bar or bars in place atop the duct bank. The present disclosure also includes a unique installation tool for accomplishing the method. Finally, a number of additional features are disclosed that make the method field-installation friendly.

The one-way retainers or push nuts of this disclosure may be considered as circular push-on rings or circular push-on external rings that fit onto the outer or external portion of a shaft or other mating part. These rings resemble a washer with internal teeth and a hollow center. These "washers" are not always flat, but may present the inner teeth at an angle to the outer, flat portion of the washer. In general, the use of push nuts avoids the cost of threading the end of the shaft or other mating part, such as rebar, during fabrication. The roughly circumferential ribs of rebar tend to act as "threads" which engage the push nut and prevent its backward movement after assembly. Many other types of retainers or one-way retainers may also be used. These include retaining rings, also known as self-locking retaining rings, including those with internal teeth and also including retaining rings with an irregular, oval-shaped or elliptical inner diameter. Some embodiments may not have teeth, but may have a smooth internal surface which is intended to bend and then engage the ribs of the rebar or other shaft used for retaining. There are many examples of these retainers, such as those shown in the Arcon catalogue, from Arcon Ring and Specialty Corp., Carol Stream, Ill., 60188. The catalogue was downloaded on Aug. 22, 2019, from website https://www.arconring.com/wp-content/uploads/2014/11/arconcatalog.pdf. This 45-page catalogue is disclosed as a part of this application and incorporated by reference into this disclosure as if each page were fully set forth herein. The catalogue is made available in an Information Disclosure Statement, filed with this patent.

Figure 1A:
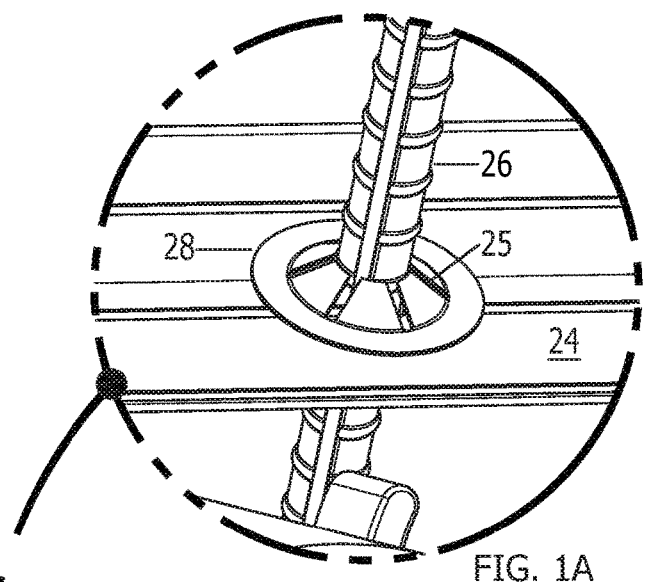
FIG. 1A is a close-up view of the interface between a securing rod, a hold-down bar and a one-way retainer.
Figure 1:
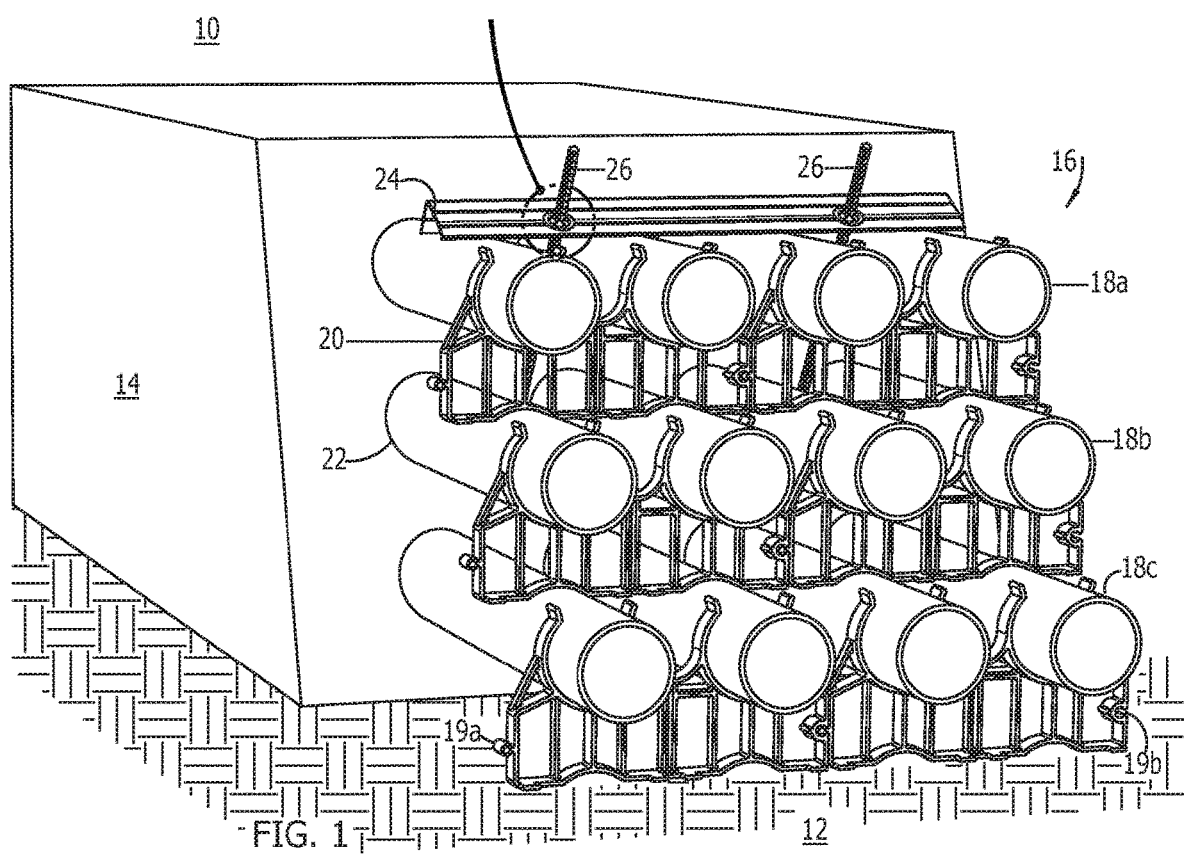
FIG. 1 is a perspective view of a duct bank using an embodiment of this disclosure.

FIG. 1 discloses the installation 10 of a duct bank 16 encased in concrete 14 in a trench in the ground 12. The duct bank 16 includes three tiers of conduit or ducts 22. In vertical order, these tiers comprise an upper tier 18a, a middle tier 18b and a bottom tier 18c. Other orders and arrangements of conduits or ducts 22 into tiers may also be used. Each tier, such as bottom tier 18c, includes two duct spacers 20, and in this example, each duct spacer holds two conduits 22. The duct spacers are arranged horizontally and joined via horizontal attachment features. These features include a joining tab 19a for engagement with a joining slot 19b. The joined tabs and slots link the spacers horizontally and add a measure of stability to the duct bank. The middle tier 18b is similarly constructed, and is the upper tier 18a. Thus, each tier is formed from spacers 20 and conduits or ducts 22.

The conduits or ducts themselves may range from 1 inch (2.5 cm) diameter or less to 10 inches (25 cm) diameter or more, with installations typically using commercially-available conduits or ducts. Note that the three tiers 18a, 18b, 18c of duct spacers are spaced apart horizontally to provide an additional measure of stability. In this example, the upper tier 18a is separated horizontally from the middle tier 18b by what appears to be about one conduit diameter. Middle tier 18b is separated horizontally from bottom tier 18c by a similar distance. Other separation distances may be used. This combination of spacers 20, conduits or ducts 22 and the spacing between them into tiers 18a, 18b, 18c, helps the stability and dimensional integrity of duct bank 16. This integrity is needed when the trench is filled, such as by filling with, earth, sand or concrete.

As discussed above, the duct bank 16 may tend to move sideways or to float upwards when the trench is backfilled. To prevent this, duct bank 16 is secured to the ground 12 via a hold-down bar 24 and one or more securing or retaining rods 26 that are driven into the ground. The hold-down bar 24 extends the about the width of the duct bank, and holds down each of the conduits or ducts 22 in the upper tier 18a. The securing rods 26 each penetrate the hold-down bar via orifices 25, as seen in FIG. 1A. As also shown in the close-up view of FIG. 1A, a one-way retainer 28 is mounted tightly on each securing rod 26 so that the one-way retainer 28 presses down on hold-down bar 24, which provides a vertical force to prevent flotation or movement of the duct bank 16.

The retainer 28 is a one-way retainer that can move in only one direction on the securing rod 26, downwardly, to prevent upward movement of the hold-down bar 24. Note in FIG. 1A that the outer portion of retainer 28 extends vertically downward from its inner portion that is in contact with the securing rod, the inner portion being vertically upward while the outer portion is vertically downward. Note also that it is the outer portion of retainer 28 that interfaces with hold-down bar 24 while the inner portion of one-way retainer 28 interfaces with securing rod 26. When securing the one-way retainer 28 on the securing rod, the one-way retainer is placed onto the securing rod 26 with the outer portion downward and the inner portion upward. With this technique, the one-way retainer 28 is able to move only one way, downward. If upward movement is attempted, the retainer will distort or bend and may not work as intended. As will be seen below, this one-way-only capability ensures that the hold-down bar will maintain contact with the top of the duct bank once the duct bank is assembled and the hold-down bars and securing rods are installed. While the one-way retainer or push nut can be snugged downward, upward movement is not possible, short of extraordinary forces applied to the duct bank or the retainer.

A second example of a duct bank is disclosed in FIG. 2. In this example, a single-tier duct bank 30 has been encased in concrete 14 in a trench. In this example, a single duct spacer 20 is used to secure and space apart three conduits or ducts 22. Duct bank 30 is secured to the ground 12 via two securing rods 26, which may be rebar, such as steel rebar rods typically used to reinforce concrete. Rebar has the advantage of being inexpensive and universally available in a variety of sizes. For example, #3 rebar is approximately ⅜ inch (9 mm) diameter and #4 rebar is approximately ½ inch (11 mm) diameter. Other sizes or materials may be used. In this cross-sectional view, hold-down bar 24 is secured to the securing rods 26 via a single one-way retainer 28 on each of the securing rods. The securing or retaining rods extend a considerable distance into the earth, typically 24 inches (61 cm) or more. Other lengths of engagement with the earth may be used, the actual length used depending somewhat on the soil or ground into which the duct bank is place, the grip or purchase of the soil or ground on the securing rods, and so forth.

A ground rod driver is typically used to push each securing rod into the earth in the desired location. This may be accomplished by a power hammer with a ground rod driver bit. Other tools and techniques may be used including, but not limited to, powered machinery and manual methods, such as a sledge hammer or other heavy hammer. Each retaining rod should be cut to the desired length, such that the rod includes sufficient length for a desired engagement in the ground and protrusion above the duct bank. The rod should thus include sufficient length to extend through the duct bank, and to protrude above the duct bank to provide for sufficient engagement with the hold-down bar and the concrete or other fill used for the duct bank.

Above the hold-down bar, it is considered a best practice to have a minimum of about 3 inches (8 cm) of concrete above the duct bank. This helps to ensure stability and long-life of the installation. Thus, FIG. 2 depicts about 4 inches (10 cm) of concrete fill above the duct bank. A side view of FIG. 2 is depicted as FIG. 3. In FIG. 3, securing rod 26 is seen to be driven into earth 12 at an angle A, shown here as about 35 degrees. A 35-degree angle provides good engagement, but no particular angle is required and the securing rod may even be driven into the ground vertically, although this is not recommended. The use of an angle provides for greater engagement length and is more resistant to vertical forces than a direct vertical placement. As also seen in FIG. 3, the position of hold-down bar 24 is somewhat affected by the angle used. This embodiment of a hold-down bar is also seen to be generally L-shaped, with a shorter side of the L engaging duct 22 of the duct bank and a longer side of the L engaging the securing rod 26 and the one-way retainer 28.

FIG. 3A is an enlarged view of a portion of the cross-section of FIG. 3. FIG. 3A depicts in greater detail how the hold-down bar 24 engages conduit 22. Note that both ends of the "L" shape of the hold-down bar 24 engage conduit 22. Again, the shorter side of the L contacts only conduit 22 while the longer side engages the securing rod 26 and the one-way retainer 28. Engaging both sides of the L promotes greater mechanical stability and force transmission from the securing rod(s) to the duct bank, through the hold-down bar and the retainer 28. As shown in FIGS. 2, 3 and 3A, if the securing rod 26 is installed at an angle, less concrete may be needed to cover the top of the securing rod. Thus, to ensure a minimum of about 3 inches (8 cm) of concrete above the duct bank, it may be better to have more than a 3-inch length of securing rod or rebar. For example, a protruding length of 4 inches (10 cm) of rebar will help to ensure compliance with a desired minimum of top fill for the duct bank. Thus, it is desirable for a length of about 3-4 inches (8 to 10 cm) of securing rod or rebar to protrude above the hold-down bar. When the concrete or other fill is poured, covering a rebar of this length with concrete ensures that the minimum thickness of 3 inches (8 cm) of concrete is met. Other lengths of the securing rod or rebar and other thicknesses of concrete or other fill may be used as desired or required, and the length of rebar protruding may be adjusted as needed or desired.

The present disclosure helps the installation in a very concrete way. One embodiment of the disclosure includes placing the one-way retainer a reliable, repeatable distance from the near end of the securing bar. In an example, the hand installation tool described below may include a counterbore for the one-way retainer and a stop for placing the one-way retainer exactly 4 inches (10 cm) from the end of the securing bar. After the one-way retainer is placed onto one end of the securing bar, the opposite end of the securing bar is inserted through a hole or orifice of the hold down bar and then inserted through the duct bank. The opposite end of the securing bar is then driven into the bottom of the trench. Each securing bar may be cut to the same length and each one-way retainer is placed the same distance from the near end. The installer then has only to embed each securing rod into the trench until the one-way retainer contacts the hold-down bar. Each securing bar thus extends that same distance above the hold-down bar, making for a uniform, secured duct bank. When the trench is backfilled with concrete, all the securing rods will be uniformly covered. This provides a guide to proper trench fill—when the rods are covered over, no more fill is needed.

As also shown in FIGS. 2, 3 and 3A, L-shaped hold-down bar 24 may be relatively thin compared to the duct bank and the installation generally. The hold-down bar is preferably non-metallic and may be injection molded or compression molded, or may be an extrusion. The hold-down bar may have a thickness from about 2 mm (0.08 inches) to about 4 mm (0.16 inches); other thicknesses may be used as desired and as helpful. The hold-down bar may be made from high-impact polystyrene (HIPS), polyethylene, reinforced plastic, or other suitable materials. Generally speaking, the duct bank and the materials used are buried underground and are subject to the temperature and humidity in the environment where they have been installed. Materials suitable to that environment should be used; non-metallic materials are generally preferred.

A more detailed look at a securing or retaining rod and the one-way retainer is seen in FIG. 4. In this figure, the securing or retaining rod 40 is made from #3 rebar. #3 rebar includes a central shaft 42 with circumferential external ribs 44 at about a 45-degree angle to the axis of the central shaft 42. The generally circumferential external ribs need not be continuous along the length of the central shaft. #3 rebar also includes two axial ribs 46 at about 180-degrees on both sides of the shaft. In general, #3 rebar, also known as No. 10 soft metric rebar, has a nominal diameter of 0.375 inches (about 10 mm) and the ribs have a minimum average height of 0.015 in. (0.38 mm) per ASTM A605/A615M-15a, for deformed and plain carbon-steel bars for concrete reinforcement. Steel rebar has a thermal coefficient nearly equal to that of concrete, thus making rebar an almost ideal reinforcement for concrete. In this application, rebar will interface well with concrete used for the duct bank, since their thermal expansion coefficients are closely matched. Common rebar may be made of tempered steel and may be unfinished. The rebar used to anchor duct banks may be epoxy-coated or galvanized, in order to minimize its corrosion potential. Other sizes of rebar may be used, including, but not limited to, #4 rebar, which has a nominal diameter of 0.500 inches (about 12.7 mm) and a minimum average rib height of 0.020 in (0.51 mm). Other materials may be used for anchoring or securing duct banks.

As also shown in FIG. 4, a one-way retainer 48 is placed on the retaining rod. The retainer is forced onto the rod in the direction of arrow 41 in FIG. 4. In this exemplary embodiment, one-way retainer 48 may be a push nut having an outer web 49a, a central bore 49c, and a plurality (six) of internal teeth or fingers 49b. They are typically made of relatively thick materials, such as from 24 ga to 9 ga steel. 24 ga steel is about 0.024 inches (0.6 mm) thick while 9 ga steel is typically about 0.148 inches (3.8 mm thick). Other thicknesses and other materials may be used. In the embodiment of FIG. 4, one-way retainer 48 has been inserted about 3.5 inches onto the retaining rod 40. Other insertion lengths may be used.

Figure 7:
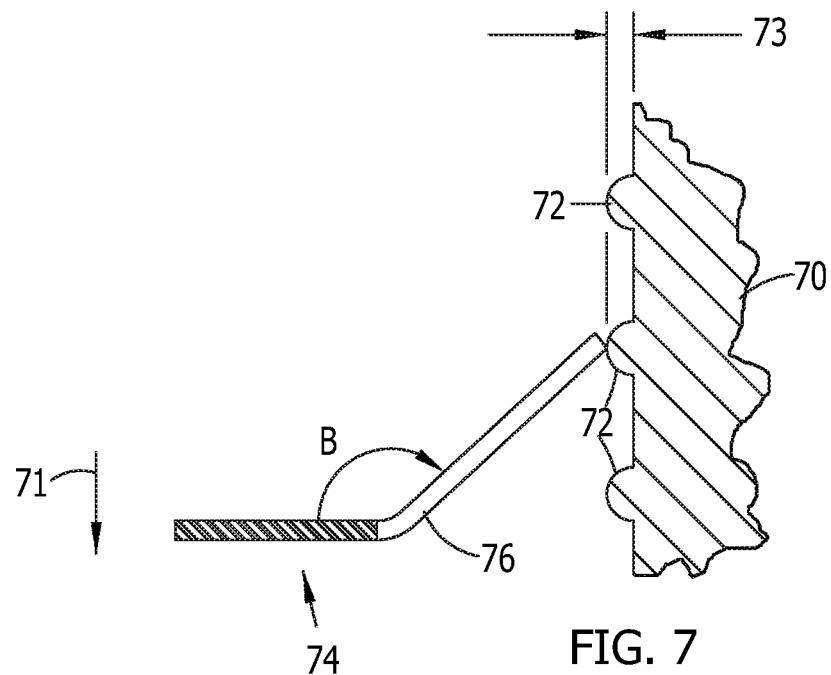
FIGS. 7-8 depict the interaction between a push-nut retainer and a reinforcing or securing rod to be embedded in concrete.
Figure 8:
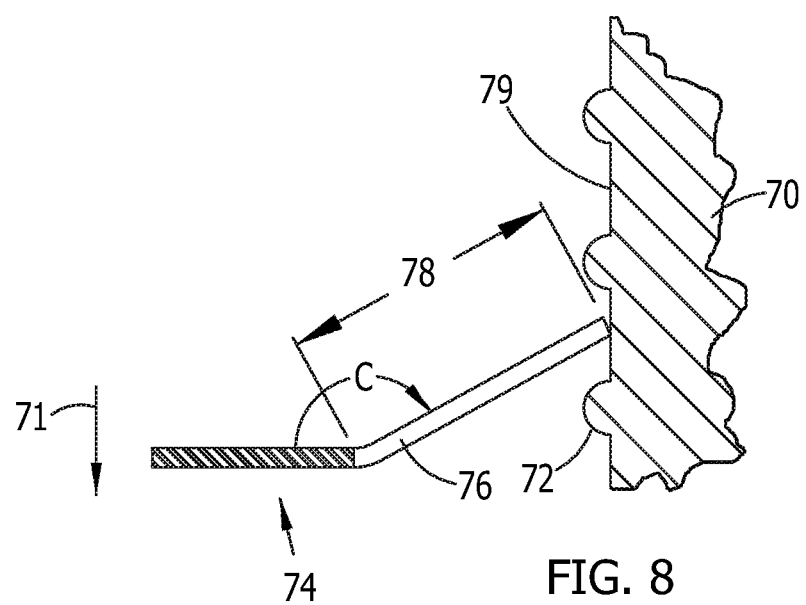

As shown in FIG. 4, the internal teeth 49b are fit onto retaining rod 40 with an interference fit. That is, the teeth or fingers 49b and the circumferential ribs 44 wish to occupy the same space; this may also be the case with fingers 49b and axial ribs 46 if the spaces between the fingers do not align with the axial ribs 46. This interference fit makes movement in the indicated direction difficult, because each of the teeth must bend or flex to allow passage along each circumferential external rib 44. Push nuts are generally stampings made from carbon steel or other types of steel, or from other materials. When these materials are stamped, the push nuts formed are distorted into the shape depicted in the above figures, as shown in FIG. 4. The thickness of the material makes it difficult, but not impossible, to distort or bend the material in any manner other than that indicated in FIG. 4. Thus, when a push nut or one-way retainer 48 is forced downward onto retaining rod 40 in the direction indicated, the individual internal teeth 49b will bend slightly upward, opposite the direction of the arrow, as the retainer 48 moves down the shaft in the direction of the arrow. A closer look at these geometries follows below and are explained as shown in FIGS. 7-8.

It is possible for the one-way retainer to be installed in the opposite manner, i.e., upside-down from the orientation of the one-way retainer 48 in FIG. 4. In order for the retainer to move in the opposite direction, upward, each tooth would have to bend in the opposite direction, i.e., downward, and each tooth would thus have to bend downward under the outer web 49a portion (see FIG. 5) of the one-way retainer as the retainer moves upward. This is possible, but even with thin push nuts, such as those made from 21 ga steel or thinner, the effort would require almost superhuman strength, and in any case, strength and effort much greater than that required to move in the desired direction. Accordingly, a one-way retainer may be defined here as a retainer that is installed for retaining in a mechanical situation with a nominal effort, while its movement in the opposite direction would require a much greater effort.

A push nut is an exemplary embodiment of a one-way retainer. Other one-way retainers may include, but are not limited to, star washers, locknuts with internal teeth, shaped one-way retaining rings, retaining washers, tooth-lock washers, star lock washers with internal teeth, push-on retainers, wedge-lock washers, retaining rings, lock-nut shaft retainers, bolt retainers, and self-locking and retaining rings.

It is also possible that one-way retainers could be made from non-metallic materials, e.g., molded, such as parts that are injection molded or thermo-formed into the desired shape. These non-metallic one-way retainers would have the same results in terms of ease of deformation of the material in the opposite direction—very difficult. Metallic one-way retainers may be preferable because they are commercially available in a wide variety of shapes and sizes.

One-way retainers typically have a thickness much greater than the thickness or width of the material used to make the retainer. For example, a commercially-available push nut may be made of galvanized spring steel 0.022 inches (0.56 mm) thick, but the as-furnished push nut has a height of about 0.125 inch (3 mm), the part height thus being about 6 times the material width. The one-way retainers have a height typically at least four or five times the width of the material from which they are made. The one-way retainers may thus be said to be elongated in an axial direction. A one-way retainer may also be defined as a retainer having a height typically at least four or five times the width of the material from which it is made.

The above disclosure concerns the configuration of a duct bank, furnishing anchoring or securing rods and driving them through the duct bank and anchoring the rods into the ground. The next portion of this disclosure teaches how the one-way retainers are used to secure the hold-down bars to the anchoring rods. The hand tool herein described in FIGS. 5-6 may be used for the precision placement of the one-way retainer, as shown above in FIG. 4. As shown in FIG. 5, a hand tool may be used to push the one-way retainer a precise distance onto a securing or anchoring rod. Installation hand tool 50 includes a handle or proximal end 52 and a distal end 54. The distal end 54 mounts a one-way retainer 48 via an outer ledge 56 and an inner edge 57. Outer ledge 56 and inner edge 57 comprise a counterbore for placement or mounting of the push nut or other one-way retainer within the installation tool. The tool may also include a handle with circumferential ridges 58 for more easily gripping the tool.

To use the tool 50, push nut/retainer 48 is placed into the tool as shown. The outer web 49a of the tool mounts to the outer ledge 56 of the mount. The central bore 49c of the one-way retainer 48 is disposed within the inner edge 57 of the tool. The internal teeth 49b of the one-way retainer are disposed between the outer ledge 56 and inner edge 57. Thus, the outer portion of the tool 50 mounts the outer web 49a of the retainer 48. When the user wishes to place the retainer 48 onto a retaining rod 40, the user pushes the tool 50 and the retainer 48 downward, as indicated by the arrow 51, onto retaining rod 40. The top surface of the outer web 49a, as depicted in FIG. 5, and the bottom of the central bore 49c are outer surfaces of the one-way retainer 48.

Figure 6:
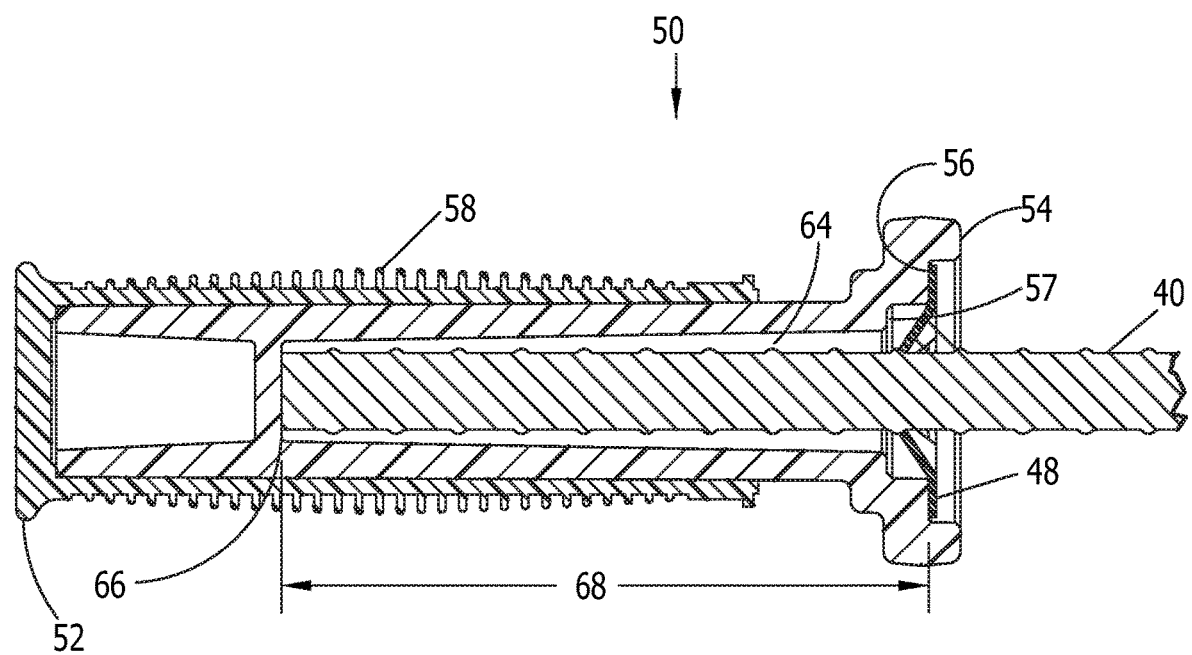
FIG. 6 is a cross-sectional view of the installation tool after the one-way retainer of FIG. 5 has been installed onto the securing rod.

The result of the placement is depicted in FIG. 6, which also shows internal details of the hand tool 50. Hand tool 50 includes the proximal end or handle 50 and the distal end 54. Outer ledge 56 is now shown to mount the push nut 48, which has been pushed onto retaining rod or rebar 40. The push nut 48 is mounted between outer ledge 56 and inner edge 57. Placement of the push nut onto retaining rod 40 is completed when the user pushes the push nut 48 onto the retaining rod until the top end of the retaining rod 40 bumps into distance gauge stop 66. The distal end 54 of the hand tool thus incorporates a distance gauge 64 from the inner edge 57 to the distance gauge stop 66. The distance gauge is incorporated in order set a desired distance 68 from the gauge stop 66 to the central bore 49c of the push nut 48. As discussed above, this distance may be 3-4 inches (8 to 10 cm) or other distance as desired. Once the hand tool has been created, each push nut or other one-way fastener will be placed that exact same distance from the end of each securing rod or rebar used to secure the duct bank.

The hand tool may be molded of plastic, such as urethane, polyethylene or polypropylene, or other suitable material. The grip portion or proximal end 52 of the hand tool is preferably made from a softer plastic that is easy to grip, such as urethane, while the distal end 54 may be made from a somewhat harder material, e.g., a firmer grade of polyethylene, nylon, or even a reinforced plastic. In one embodiment, and as shown in FIG. 6, the tool may comprise two ends 52, 54 made from separate materials, one harder, one softer, and joined together by an adhesive. In another embodiment, the two ends may be made from separate materials and interference-fitted as shown explicitly in FIG. 6, without an adhesive. In another embodiment, the distal end 54 may be molded from a firmer material, such as nylon or polyethylene, which is then used as an insert around which the proximal end 52 is over-molded. Note that the distal end is preferably dimensionally stable, because the distal end is used to mount the one-way retainer and to push the one-way retainer down the engagement length of the rebar or other securing rod used to secure the duct bank with in the trench.

In one embodiment, at least the proximal end of the hand tool, i.e., the handle, may be molded of a bright color for easy visibility during assembly of the hold-down bars to the duct bank. For example, the proximal end may be molded from bright yellow color, a dazzling white color, a visible red color, and so forth. Urethane may be available in a variety of colors, allowing for customization of at least this part of a project for one or more customers. Urethane is available in a variety of hardnesses, such as easy-to-grip softer grades.

The user places the duct bank into the trench. The user then places a hold-down bar across the duct bank, taking care to align the holes or orifices of the hold-down bar between vertical rows of ducts or conduits in the duct bank. The user then places a push-nut or other one-way retainer into the installation tool as described above and uses the installation tool to mount the push-nut onto the near end of a securing or retaining rod. The installation tool is then removed, leaving a securing rod with a one-way retainer mount a set distance from its near end.

The opposite or far end of the securing rod is then threaded or placed though one hole or orifice of the hold-down bar, and driven through the duct bank until the securing rod reaches the bottom of the trench, e.g., the ground. Preferably, the securing rod is at about a 35-degree angle as it rests on the ground. The securing rod is then driven into the ground. A ground rod driver or other tool may be used. The user then drives the far end of the securing rod in the ground at the desired angle until the one-way retainer at the top end of the securing rod slightly deforms the hold-down bar due to the pressure applied by the one-way retainer. The installation tool provides only one-way insertion of the one-way retainer onto the rebar. The user may then go on to the next anchoring rod/rebar used for that particular hold-down bar until installation is complete for that hold-down bar. The user then repeats this process for each hold-down bar until the entire duct bank has been secured.

The advantage of one-way retainers comes into play when the securing rods are embedded into the trench holding the duct bank, as discussed above with the 35-degree angle. When the user drives the securing rod into the trench, the power hammer or other tool may be difficult to control. Thus, while the user may wish to drive the securing rod just enough to "slightly deform" the hold-down bar, this degree of control may be difficult to achieve. If the securing rod is driven just a little too far, the hold-down bar may be more than "slightly" deformed. However, even in this situation, the one-way retainers disclosed herein will maintain their position on the securing rod and will not move. The one-way retainer will thus continue to bear against the hold-down bar and resist movement of the duct bank. This will not be the situation with ordinary fasteners, such as type E retaining rings.

As discussed above, a push nut is a type of fastener used to secure a shaft in a range of mechanical applications. In the present disclosure, a push nut is used as a one-way retainer to secure a hold-down bar to a concrete reinforcing or securing bar, which may be considered a shaft. As noted above, rebar is not threaded but the types of rebar used in securing duct banks typically have ribs or extended surfaces, which may be circumferential, axial or both. Most commercially-available push nuts are proportioned to work on close tolerance round rods, or on close-tolerance threaded rods or shafts. As such, these push nuts only need short teeth or fingers to stay within the yield strength of the spring steel from which they are made.

Rebar used to reinforce grout or concrete in duct banks does not have a close tolerance outside diameter. For example, ASTM STD A-615/615M-15a lists a 0.375 in (9.5 mm) diameter for #4 rebar, with a rib minimum average height of 0.020 in (0.51 mm), but some specimens measured during testing were over 0.030 in (0.76 mm) in height. Thus, the rebar or securing rods used to secure the hold-down bars has an outside diameter that has many relatively large ribs over its length. For a push nut to function on rebar, it is desirable to have longer fingers to stay within the yield strength of the spring steel. It has been found by using conventional calculations, finite element analysis (FEA) and the testing prototypes that, for a push nut to function optimally on a rebar rod, within the yield strength of the spring steel from which it is made, the length of the fingers is desirably equal to or greater than 9.8 times the height of the rebar ribs.

Thus, in one example, if the minimum rib height is 0.020 inches (0.51 mm) for #4 rebar, the push nut retainer fingers are desirably 0.20 in (5 mm) long. In a second example, if the minimum rib height for #3 rebar is 0.015 in (0.38 mm), then the push nut retainer fingers are desirably 0.15 in (3.8 mm) long. The actual fingers on the push nut may be longer or shorter than this desirable proportion. However, the retaining force applied by the push nut may be greater if this proportion is met. In addition, the fingers will be subject to less stress and may be less likely to fail in the application, if they conform to this model.

Push nuts for use in the application typically have a shape of a truncated cone, with an outer diameter or rim having a width, and an inner diameter that is greater than a nominal diameter of the reinforcing rod intended for use with the given push nut or one-way retainer 28, as shown by the push nut in FIG. 1A, and shown in greater detail in FIG. 4. The rim is connected to the inner diameter by a plurality of fingers. The fingers are formed when the push nut is stamped by removing material from the area forming the fingers. In one example, a push nut intended for use with #3 rebar is formed in a general shape of a cone having an outer diameter of 1.5 in (38 mm) and an inner diameter of about 0.354 in (9.0 mm). A series of measurements was taken of #3 rebar, nominally having a diameter of ⅜ inch (9.5 mm). These measurements showed a "central" or "minor" diameter, similar to terminology used in threads, not including ribs, of 0.35 in (8.9 mm). These measurements also showed an outer or major diameter, including the ribs, of 0.402 in. (10.2 mm). A series of measurements was also taken for #4 rebar, which showed a "minor" diameter of 0.465 in (11.8 mm) and an outer or "major" diameter of 0.525 in (13.3 mm).

We define the minor diameter of the reinforcing bar as the minimum outer diameter of the reinforcing bar, the measurement not including one or more ribs. We also define a major diameter of the reinforcing bar as an outer diameter than includes at least one rib, which may be axial or circumferential. As seen in FIG. 4, rebar does not have a circular cross-section, and thus the term "diameter" is an approximation of the outer surface. The distance through a cross-section the bar at various points nevertheless can be measured and this dimension is understood to be a "diameter."

For purposes of this disclosure, a minor diameter for #3 rebar is 0.35 in (8.9 mm) and a major diameter is 0.402 in (10.2 mm). Per the ASTM standard cited, the minimum rib height for #3 rebar is 0.015 in (0.38 mm). A length of fingers that is 9× the minimum rib height for #3 rebar is thus 9×0.015 in (0.38 mm)=0.135 in (3.5 mm). Also for purposes of this disclosure, a minor diameter for #3 rebar is 0.35 in (8.9 mm) and a major diameter is 0.402 in (10.2 mm), and a minor diameter for #4 rebar is 0.465 in (11.8 mm) and an outer or "major" diameter is 0.525 in (13.3 mm). A length of fingers that is 9× the minimum rib height for #4 rebar is thus 9×0.020 in (0.51 mm)=0.18 in (4.6 mm).

The situation is illustrated as shown in FIGS. 7-8. In FIG. 7, securing rod 70 has external ribs 72 extending outward from the main body of the securing rod as shown by the dimensional arrows 73, the dimensional arrows indicating a height of the rib. Securing rod 70 is receiving push nut 74, which is being thrust downward, as shown by arrow 71. This situation is similar to that seen earlier in FIG. 4. As push nut 74 moves downwards, securing rod finger 76 bends at an angle B shown in FIG. 7, the bending caused as finger 76 moves past one of the ribs 72. Downward motion continues in FIG. 8, again as shown by arrow 71, as the push nut 74 and the finger 76 clear the rib 72 and move into space 79 between ribs 72. FIG. 8 also illustrates length of finger 76, as shown by dimensional arrows 78. Finger length 78 is taken as the straight length of the finger after the bend shown as angle B and angle C. The length is necessary for the finger to bend as the push nut and its fingers move. Note that angle C in FIG. 8 is less than angle B in FIG. 7. FIG. 8 thus depicts a rest position of the push nut after it has been installed on the reinforcing rod, the fingers having to bend while moving into position, and then able to relax once the push nut has been properly positioned.

In addition to the one-way push nut fasteners described and discussed above, a variety of other one-way retainers may be used. See for example, a journal article concerning the proper use of retaining rings, *Using retaining rings properly*, by Jonathan Slass, in Machine Design, Nov. 4, 1999, article downloaded from website https://www.machinedesign.com/archive/using-retaining-rings-properly, Aug. 22, 2019. This article is incorporated by reference in its entirety and is also cited in an Information Disclosure Statement filed with this patent. A few non-limiting examples of one-way retainers are disclosed in FIG. 9, including a hexagonal-shaped push nut 90, an oval-shaped 3-D one-way retainer 92, a rectangular-shaped push ring 94, a square-shaped push ring 96 and a 3-D retainer 98 having three teeth. The use of such fasteners, and the variety of fasteners that may be used, is discussed in the trade journal cited above. As discussed above, these one-way fasteners typically have a height or thickness dimension much greater than the thickness of the material itself, and can be moved in a desired direction much more easily than a direction opposite to the desired direction.

The hexagonal-shaped push nut 90 in FIG. 9 is three-dimensional in that it has a length and width in two dimensions, and also has depth, that is, a smaller dimension in the general directions into and out of the page on which the image of the push nut is displayed. There are eight (8) internal teeth intended for engagement with a screw or shaft about which the push nut will be placed. The one-way retainer 92 has an ovate or oval-shaped inside, including a minor diameter and a major diameter of the oval shape, and may include five internal separate teeth as shown. One-way retainer 92 may also be configured as a retaining ring with external tabs for placement about a shaft with a spanner wrench.

Rectangular-shaped push ring 94 includes a complicated inner structure that may be considered to be two internal teeth. Note the three-dimensional structure of the ring, having a thickness that is supplied by the upward bending of the two internal teeth. Square-shaped push ring 96 also has a three-dimensional structure. Push nut 98, with a general configuration of an external snap ring, but with a complete circumference, may be considered to be a one-way fastener in the sense that it may only be moved in one direction onto a shaft, such as rebar. Any attempt to move in the opposite direction will require a great deal more force, to overcome the bent shape of the push nut. As seen in one-way retainer 90, the outer rim may be flanged, i.e., itself having depth. The outer rim may include installation tabs or other mechanical assistance devices.

Figure 10A:
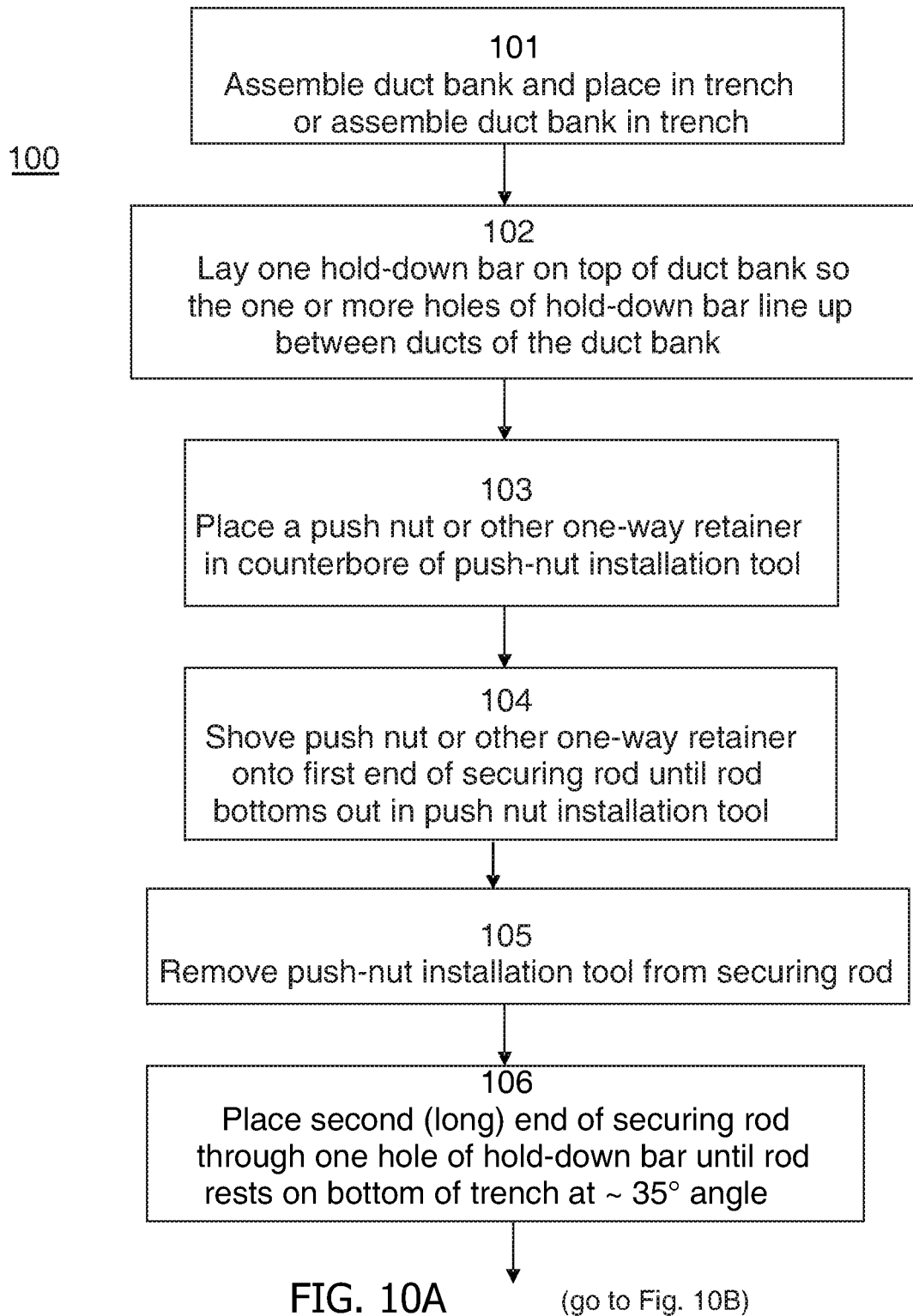
FIGS. 10A and 10B present a flowchart illustrating a method for securing a duct bank using one or more hold-down bars.
Figure 10B:
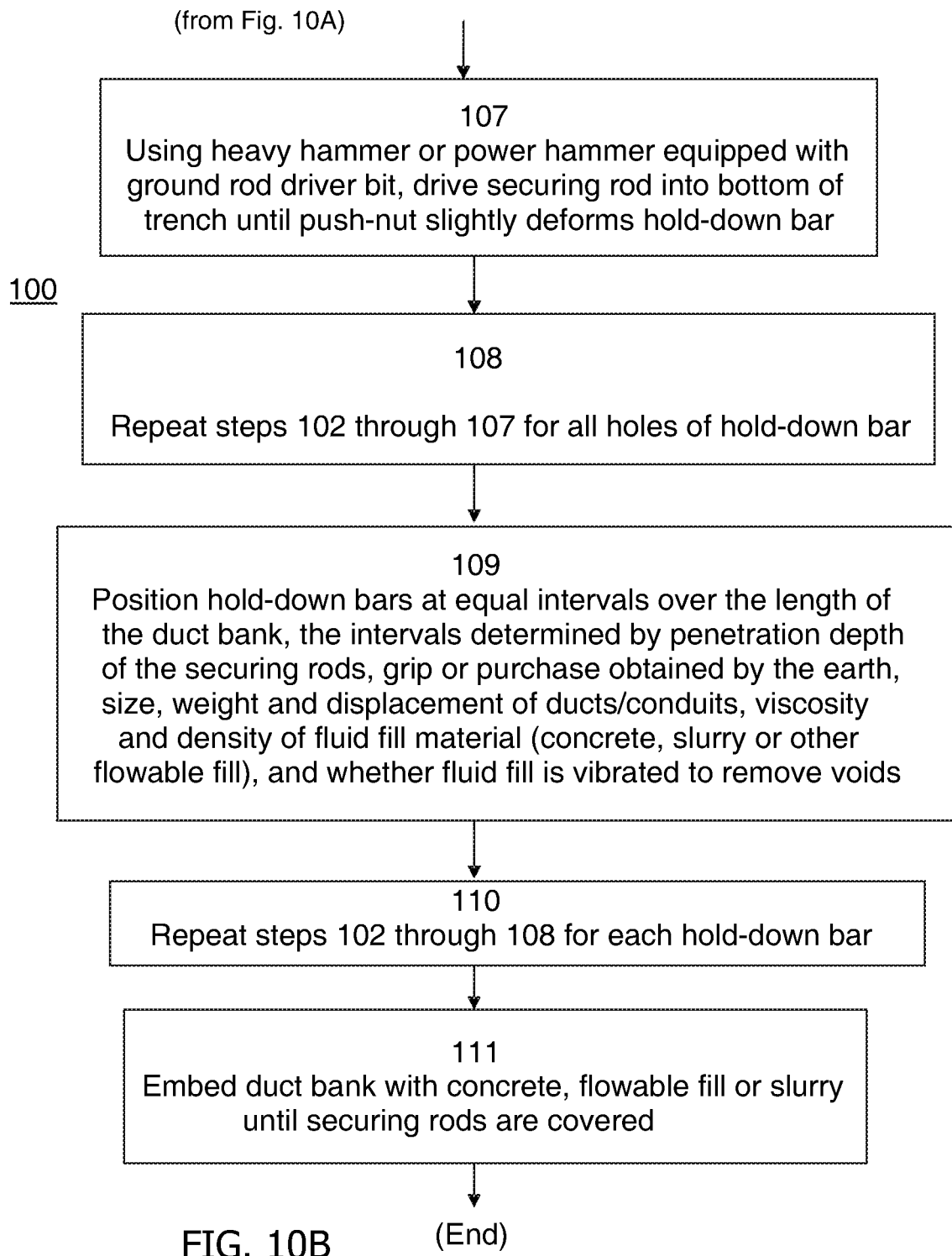

There are several ways to put this disclosure into practice, as outlined above. A few ways are presented in FIGS. 10A and 10B. In this method 100, one may assemble a duct bank, as described above and place 101 the duct bank into a trench. Alternatively, the duct bank may be assembled in place in the trench, as shown in FIG. 10A. The duct bank may include one or more tiers of ducts or conduits, the ducts or conduits secured with non-metallic duct spacers or other means for spacing. In one way of practicing this disclosure, a hold-down bar as described above is laid 102 across the top of the duct bank. The placement of the hold-down should align the holes or orifices of the hold-down bar between the ducts or conduits of the duct bank. A push-nut or other one-way retainer is then placed 103 in the counterbore of the push nut installation tool. Using the push nut installation tool, the user then shoves 104 the push nut onto the near end of a securing rod or conduit for securing the duct bank within the trench until the conduit or securing rod bottoms out in the push nut installation tool. The push nut installation tool is then removed 105 from the conduit or securing rod, leaving the push nut or other one-way retainer in place.

The far end of the conduit or securing rod is then placed 106 through a hole or orifice of the hold-down bar until the far end of the conduit rests on the bottom of the trench. The rod is preferably at about a 35-degree angle, as described above. The securing rod is then driven 107 into the earth or bottom of the trench. A depth of at least two feet, 24 inches (61 cm), is preferable. A heavy hammer or power hammer equipped with a ground rod driver bit may be used. The rod is driven into the ground until the push-nut slightly deforms the hold-down bar. By following this procedure, and the installation gauge of the push nut installation tool, the securing rod will protrude about 3-4 inches (8-10 cm) above the duct bank, as determined by the installation gauge. The steps described above, steps 103 through 107, are then repeated 108, with a separate push nut and securing rod or conduit for each orifice or hole of the hold-down bar. This procedure will then complete the installation of one hold-down bar.

A number of hold-down bars will be required for each duct bank installation. Hold-down bars may be placed 109 along the length of the duct bank. Intervals between hold-down bars are determined by the duct bank itself and the ground conditions for each installation. The intervals are determined by a number of variables, such as the penetration depth of the securing rods, the grip or purchase of the earth on the securing rods, and the size, weight and displacement of the ducts or conduits. Other factors to be considered include the viscosity and density of the fluid fill material, which may be concrete, slurry, or other flowable fill. Another factor may be whether the fluid fill is to be vibrated to remove voids, such as air pockets. While duct bank fill is not normally vibrated, this procedure may place additional stresses on the duct bank that should be considered. Steps 102 through 108 are then repeated 110 for each hold-down bar. Finally, the duct bank is then embedded 111 by filling with concrete or flowable fill until the securing rods protruding from the duct bank are covered. This ensures that any minimum fill requirement is met.

It should be understood that duct banks may be several hundred feet long, or even longer, and thus may require many hold-down bars spread over the length of the duct bank. Thus, it may be prudent to use a hold-down bar about every 3-4 feet (1 meter) or so; other reasonable distances may be used as a rule of thumb. It is understood that the apparatus and method described herein are intended to cover such larger installations, one hold-down bar and set of securing rods at a time. Most of the discussion above concerns securing the duct bank from vertical movement. Note that horizontal movement is also prevented in this disclosure, so long as there are two securing rods per hold-down bar, or so long as there are two hold-down bars in a given length. This disclosure provides a significant improvement in this technology.

There are many ways to practice this disclosure. Where methods of use are taught or claimed, common sense should be used in interpreting the disclosures or claims, and in general, the steps of the methods may be performed in a different order than specifically set out and claimed herein. For example, one method described herein teaches placing a hold-down bar atop the duct bank before embedding securing rods through the duct bank into the earth. It is also possible to first drive the securing rods into the earth and then fit the hold-down bar to the embedded rods, but this would be much more difficult than first fitting the rod or rods through the hold-down and then embedding the rods into the trench. This disclosure suggests first placing a one-way retainer onto a securing rod, then placing the rod through an orifice of the hold-down bar, and then embedding the securing rod into the trench. In one variant, a user could place the one-way retainer onto the securing rod after it is embedded; however, a follow-up effort at snugging the one-way retainer onto the hold-down bar might be required if the securing rod is not driven into the ground precisely the right distance at precisely the correct angle with the first effort. It is also possible to embed the securing rods into the ground before placing the duct bank into the trench, rather than the claimed order; this alternate order is possible, but is not as practical as the preferred order. The steps of the methods may be performed in a different order than specifically set out and claimed herein; the claims in particular are not bound by the claimed order of the steps where a different order of the steps is possible.

While this disclosure discusses particular methods for securing a duct bank, a set particular order of steps is not required. Of course, some steps must be performed in a stated order: a one-way retainer must be placed onto the second end of a securing rod before the one-way retainer is used to secure the hold-down bar to the securing rod directly atop the duct bank. However, the securing rods could be driven in to the ground before the one-way retainers are placed onto the securing rods, even though a different method is discussed above, namely, placing the one-way retainers onto the securing rods before driving the rods into the ground. Thus, in general, the steps of a method may be performed in a different order than that specifically set out or claimed. It is also possible to place a one-way retainer onto the securing rod manually rather than using the installation tool. The use of one-way retainers is not known in duct bank art and their use would be advantageous even without the installation tool. Accordingly, this disclosure includes methods of use of one-way retainers or push nuts as described herein even without the installation tool.

The one-way retainers used in the present disclosure are commercially-made and commercially available products. As such, they are not perfect geometrical shapes, such as those described as having a shape of a "circle," a "square," an "oval" or "ovate" shape, and so forth. When these or other geometric or descriptive terms are used they are approximations of the desired shape rather than adhering to strictly geometrical perfection. There will always be some variation from perfection in the shape of these described and claimed objects. It should be understood that the described or claimed objects, or the tools described herein for use with such objects, have features that are approximations or "generally in the shape of a," with the appropriate geometric term inserted in the blank. In a similar fashion, an object described as "L-shaped" or "star-shaped" is also an approximation and is understood to be "generally L-shaped," rather than a perfect shape of the letter "L," or "generally starshaped," rather than a perfect shape of a star, as the writer intends and the reader interprets a particular term or passage.

All references, including publications, patent applications and patents cited herein are hereby incorporated by reference to the same extent as if each reference were individually and specifically indicated to be incorporated by reference and were set forth in its entirety herein.

The use of the terms "a," "an," and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out the invention. Variations of those preferred embodiments may become apparent to those of ordinary skill in the art upon reading the foregoing description. Skilled artisans will use such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for securing a duct bank in a trench with a push nut for use with a reinforcing bar, the push nut comprising an outer rim and an inner orifice, wherein the inner orifice is greater than a minor diameter of the reinforcing bar and less than a major diameter of the reinforcing bar that includes at least one rib, and a plurality of fingers connecting the outer rim to the inner orifice, the method comprising:
   a) placing a hold-down bar across a top of the duct bank in the trench;
   b) placing the push nut into a counterbore of a push nut installation tool;

c) placing the push nut onto a near end of a securing rod using the push nut installation tool until the near end of the securing rod bottoms out in the push nut installation tool;

d) removing the push nut installation tool from the securing rod;

e) placing a far end of the securing rod through an orifice of the hold-down bar until the far end of the securing rod rests on a bottom of the trench; and f) securely embedding the far end of the securing rod into the trench until the push nut slightly deforms the hold-down bar;

g) repeating the steps of b) through f) for each orifice of the hold-down bar with a separate securing rod and a separate push nut for each orifice; and h) optionally, placing one or more additional hold-down bars across the top of the duct bank and repeating steps b) through f) for each orifice of the one or more additional hold-down bars, using a separate securing rod and a separate push nut for each orifice of the one or more additional hold-down bars.

2. The method of claim 1, wherein the step of placing the far end of the securing rod through the orifice of the hold-down bar until the far end of the securing rod rests on the bottom of the trench is accomplished so that the securing rod rests in the trench at about a 35-degree vertical angle.

3. The method of claim 1, wherein the hold-down bar is an L-shaped plastic extrusion.

4. The method of claim 1, wherein the push nut installation tool comprises a handle, a counterbore for mounting the push nut, and a distance gauge for insertion of the push nut a specified distance onto the securing rod.

5. The method of claim 4, where the push nut installation tool distance gauge comprises approximately a 4-inch (10 cm) distance for engagement of the push nut approximately 4 inches (10 cm) onto the securing rod.

6. The method of claim 1, wherein the securing rod comprises rebar.

7. The method of claim 1, wherein a length of the plurality of fingers of the push nut is at least 9 times a minimum height of the at least one rib of the reinforcing bar.

8. A method for securing a duct bank in a trench with a hold-down bar, at least one securing rod and at least one push nut, the at least one push nut comprising an outer rim and an inner orifice, wherein the inner orifice is greater than a minor diameter of the at least one securing rod and less than a major diameter of the at least one securing rod that includes at least one rib, and a plurality of fingers connecting the outer rim to the inner orifice, the method comprising:

a) placing the hold-down bar across a top of the duct bank in the trench;

b) placing the at least one push nut into a counterbore of a push nut installation tool;

c) placing the at least one push nut onto a near end of the at least one securing rod using the push nut installation tool until the near end of the at least one securing rod bottoms out in the push nut installation tool;

d) removing the push nut installation tool from the at least one securing rod;

e) placing a far end of the at least one securing rod through an orifice of the hold-down bar until the far end of the at least one securing rod rests on a bottom of the trench; and f) securely embedding the far end of the at least one securing rod into the trench until the at least one push nut slightly deforms the hold-down bar;

g) repeating the steps of b) through f) for each orifice of the hold-down bar with a separate securing rod and a separate push nut for each orifice; and h) optionally, placing one or more additional hold-down bars across the top of the duct bank and repeating steps b) through f) for each orifice of the one or more additional hold-down bars, using a separate securing rod and a separate push nut for each orifice of the one or more additional hold-down bars.

9. The method of claim 8, wherein the securing rod comprises rebar and the at least one push nut has a height or thickness at least three times greater than a width of a material from which the at least one push nut is made.

10. The method of claim 8, wherein a length of the plurality of fingers of the push nut is at least 9 times a minimum height of the at least one rib of the reinforcing bar.

11. The method of claim 8, wherein the step of securing the hold down bar to the securing rod is accomplished with a push nut installation tool, the push nut installation tool comprising a handle, a counterbore for mounting the at least one push nut, and a distance gauge for insertion of the at least one push nut a specified distance onto the securing rod.

12. The method of claim 11, wherein the push nut installation tool distance gauge comprises approximately a 4-inch (10 cm) distance for engagement of the push nut approximately 4 inches (10 cm) onto the securing rod.

13. The method of claim 8, wherein the at least one push nut forms an interference fit when installed onto the at least one securing rod.

14. The method of claim 8, wherein the at least one push nut has a truncated conical shape.

* * * * *